(12) United States Patent
Lee et al.

(10) Patent No.: US 9,516,255 B2
(45) Date of Patent: Dec. 6, 2016

(54) COMMUNICATION SYSTEM

(71) Applicant: Microsoft Technology Licensing, LLC, Redmond, WA (US)

(72) Inventors: Austin S. Lee, Seattle, WA (US); Brandon Vaughn Taylor, Woodinville, WA (US); Mark Robert Swift, Mercer Island, WA (US); Bofan Hsu, Bothell, WA (US); Shawn Crispin Wright, Sammamish, WA (US); Albert Anthony Robles, Redmond, WA (US); Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/602,217

(22) Filed: Jan. 21, 2015

(65) Prior Publication Data
US 2016/0212370 A1   Jul. 21, 2016

(51) Int. Cl.
| H04N 7/14 | (2006.01) |
| H04N 5/445 | (2011.01) |
| G06T 19/00 | (2011.01) |
| H04L 29/06 | (2006.01) |
| G06F 3/0484 | (2013.01) |
| H04N 21/4788 | (2011.01) |
| G06F 3/0481 | (2013.01) |

(52) U.S. Cl.
CPC ...... *H04N 5/44591* (2013.01); *G06F 3/04842* (2013.01); *G06T 19/006* (2013.01); *H04L 65/605* (2013.01); *H04N 7/141* (2013.01); *H04N 21/4788* (2013.01); *G06F 3/04817* (2013.01); *H04N 2005/44595* (2013.01)

(58) Field of Classification Search
CPC ........................................................ H04N 7/14
USPC .................... 348/14.01, 14.03, 14.07, 14.14
See application file for complete search history.

(56) References Cited

U.S. PATENT DOCUMENTS

| 5,915,091 A * | 6/1999 | Ludwig .................. G06Q 10/10 348/E7.081 |
| 8,331,611 B2 | 12/2012 | Johnson et al. |
| 8,494,231 B2 | 7/2013 | Folta et al. |
| 8,582,834 B2 | 11/2013 | Tong et al. |
| 8,799,827 B2 | 8/2014 | Hinckley et al. |
| 2004/0221243 A1 | 11/2004 | Twerdahl et al. |

(Continued)

FOREIGN PATENT DOCUMENTS

| CN | 102075727 | 5/2011 |
| EP | 1424652 | 6/2004 |
| WO | WO 2015130309 | 9/2015 |

OTHER PUBLICATIONS

"CyberLink YouCam 3 User's Guide", Available at: http://download.cyberlink.com/ftpdload/user_guide/youcam/3/enu/YouCam.pdf, Jul. 4, 2010, 38 pages.

(Continued)

*Primary Examiner* — Olisa Anwah
(74) *Attorney, Agent, or Firm* — Tom Wong; Micky Minhas

(57) ABSTRACT

A user device has a display, a user interface and a network interface. The network interface receive a video data stream from another user interface. A user of the user device is able to pause the video stream. The paused image of the video stream and the video stream are both displayed on the display. The user is able to annotate the paused image.

16 Claims, 11 Drawing Sheets

(56) References Cited

U.S. PATENT DOCUMENTS

| | | | |
|---|---|---|---|
| 2007/0081094 A1* | 4/2007 | Ciudad | H04N 5/2354 348/371 |
| 2007/0199031 A1 | 8/2007 | Nemirofsky et al. | |
| 2008/0084400 A1* | 4/2008 | Rosenberg | G06F 1/1626 345/173 |
| 2008/0252722 A1 | 10/2008 | Wang et al. | |
| 2009/0009598 A1 | 1/2009 | Sotodate | |
| 2009/0183220 A1 | 7/2009 | Amento | |
| 2009/0202114 A1 | 8/2009 | Morin et al. | |
| 2009/0257623 A1 | 10/2009 | Tang et al. | |
| 2010/0070878 A1 | 3/2010 | Amento et al. | |
| 2012/0032877 A1* | 2/2012 | Watkins, Jr. | G06F 1/1624 345/156 |
| 2012/0051658 A1 | 3/2012 | Tong et al. | |
| 2012/0106806 A1 | 5/2012 | Folta et al. | |
| 2012/0271711 A1 | 10/2012 | Moshiri et al. | |
| 2012/0307145 A1 | 12/2012 | Buchheit | |
| 2012/0308209 A1 | 12/2012 | Zaletel | |
| 2013/0093832 A1* | 4/2013 | Konda | H04N 7/155 348/14.02 |
| 2013/0127992 A1 | 5/2013 | Saitoh | |
| 2013/0321648 A1 | 12/2013 | Tamiya et al. | |
| 2014/0023341 A1 | 1/2014 | Wang et al. | |
| 2014/0036152 A1* | 2/2014 | Jackson | H04N 5/44513 348/564 |
| 2014/0063174 A1* | 3/2014 | Junuzovic | G06Q 10/101 348/14.02 |
| 2014/0115544 A1* | 4/2014 | Chi | G06F 3/0488 715/863 |
| 2014/0173530 A1* | 6/2014 | Mesguich Havilio | G06F 3/0482 715/863 |
| 2014/0176548 A1 | 6/2014 | Green | |
| 2014/0178047 A1* | 6/2014 | Apodaca | G06F 3/041 386/248 |
| 2014/0192140 A1 | 7/2014 | Peevers et al. | |
| 2014/0292999 A1* | 10/2014 | Do | H04L 65/608 348/14.07 |
| 2014/0368601 A1 | 12/2014 | deCharms | |
| 2015/0058709 A1 | 2/2015 | Zaletel | |
| 2015/0172599 A1 | 6/2015 | Caldwell | |
| 2015/0350565 A1* | 12/2015 | Rapport | H04N 19/44 348/581 |
| 2016/0127681 A1 | 5/2016 | Turbell | |

OTHER PUBLICATIONS

"Doodley Moore", Retrieved on: May 19, 2015 Available at: https://itunes.apple.com/in/app/doodley-moore/id495619963?mt=8, 2 pages.

"Live Image Overlay Tool with support for DXF-Format CAD Files", Available at: http://www.visionxinc.com/software-systems-machines/visiongauge-online-live-image-overlay-tool.pdf, Jan. 1, 2012, 1 page.

"ManyCam 4 for Windows", Available at: http://manycam.com/user_guide/, Mar. 27, 2014, 9 pages.

"The V1 Professional Digital Coaching System Version 2010", Available at: https://www.v1sports.com/wp-content/uploads/2011/01/V1-Pro-Manual-2010.pdf, Apr. 25, 2013, 99 pages.

"Using the Capture Screen", Available at: http://www.kinovea.org/help/en/128.html, Jun. 30, 2011, 2 pages.

Guimbretiere, et al., "Stick it on the Wall: A Metaphor for Interaction with Large Displays", In Proceedings of the 28th Annual Conference on Computer Graphics, Aug. 12, 2001, 9 pages.

"Board Cam Pro-Live Exhibitions of Small Features", Available at: https://itunes.apple.com/us/app/board-cam-pro-live-exhibitions/id434217477?mt=8, Apr. 21, 2014, 2 pages.

"Drawing on Live Video in Flex", Available at: http://narinderkumar.wordpress.com/2012/02/16/drawing-on-live-video-in-flex/, Feb. 16, 2012, 5 pages.

Ou, et al., "DOVE: Drawing over Video Environment", In Proceedings of the Eleventh ACM International Conference on Multimedia, Nov. 2, 2003, 2 pages.

Ou, et al., "Gestural Communication over Video Stream: Supporting Multimodal Interaction for Remote Collaborative Physical Tasks", In Proceedings of 5th International Conference on Multimodal Interfaces, Nov. 5, 2003, 9 pages.

"Unofficial Google+ Hangout Apps Directory", Available at: http://hangoutapps.com/+/?gid=248408684568&app=Tabletop-Forge-Google-Hangout-App, Feb. 8, 2014, 1 page.

Tsang, et al., "Boom Chameleon: Simultaneous capture of 3D viewpoint, voice and gesture annotations on a spatially-aware display", In Proceedings of the 15th Annual ACM Symposium on User Interface Software and Technology, Oct. 27, 2002, 10 pages.

Yang, et al., "Webdove: A Web-Based Collaboration System for Physical Tasks", In Proceedings of IEEE International Conference on Multimedia and Expo, Jul. 9, 2006, 4 pages.

"International Search Report and Written Opinion", Application No. PCT/US2016/014203, Apr. 21, 2016, 12 pages.

"International Search Report and Written Opinion", Application No. PCT/US2015/057913, Jan. 27, 2016, 13 Pages.

"Non-Final Office Action", U.S. Appl. No. 14/956,076, Apr. 4, 2016, 7 pages.

Essa, "Tracking Facial Motion", Motion of Non-Rigid and Articulated Objects, 1994. Proceedings of the 1994 IEEE Workshop on Austin, TX, USA, Nov. 11, 1994, 7 Pages.

Lee, "Freeze-Set-Go Interaction Method for Handheld Mobile Augmented Reality Environments", Proceedings of the 16th ACM Symposium on Virtual Reality Software and Technology, Nov. 20, 2009, 4 Pages.

Corrected Notice of Allowance, U.S. Appl. No. 14/596,076, Oct. 27, 2016, 2 pages.

Notice of Allowance, U.S. Appl. No. 14/596,076, Aug. 17, 2016, 5 pages.

"Second Written Opinion", Application No. PCT/US2015/057913, Sep. 16, 2016, 6 pages.

* cited by examiner

COMMUNICATION SYSTEM

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images.

It is known for a communication client application to provides functionality to enable a user to modify video captured at the user's device by adding two-dimensional clip-art effects.

SUMMARY

Embodiments of the present disclosure relate to annotating a displayed video frame during, for example a video call.

The inventors have recognised that while a video frame is being annotated by a user, that user will be unaware of what is going on at the other end of the video call. For example, if one user is performing surgery remotely with the assistance of another user who annotates an image, the annotating user will be unaware of what the user who is performing surgery is doing or what that user is looking at.

Some embodiments may provide a device and method to view live video stream while paused for annotation This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted.

According to first aspect of the present disclosure there is provided a method implemented at a user device, the method comprising: displaying video frames of a stream of video data received from a further user device over a communications network; detecting selection of a pause option via a user interface of said user device when a received video frame is being displayed to pause said received video frame; in response to said detection, displaying both said paused received video frame and received video frames of the stream of video data; receiving via the user interface at least one annotation input defining at least one annotation to be applied to an object of said paused received video frame; and causing information about said at least one annotation to be sent to said further user device.

According to another aspect of the present disclosure there is provided a user device comprising: a display; a user interface; a network interface configured to receive a video data stream at the user device from another user device via a communication network, said display configured to display said video data stream; and at least one processor configured to: detect an interaction via said user interface to pause said video stream and to display a paused video frame of said video stream and to also display said video data stream; detect application of at least one annotation via the user interface to said paused video frame; cause said paused video frame and said at least annotation to be displayed by said display along with said video data stream; and cause information about said at least annotation to be sent via said network interface to said another user device.

According to another aspect of the present disclosure there is provided a computer program product, the computer program product being embodied on a non-transient computer-readable medium or a computer program product and configured so as when executed on a processor of a user device during a video call between the user device and at least one further user device, to perform any of the methods described herein.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
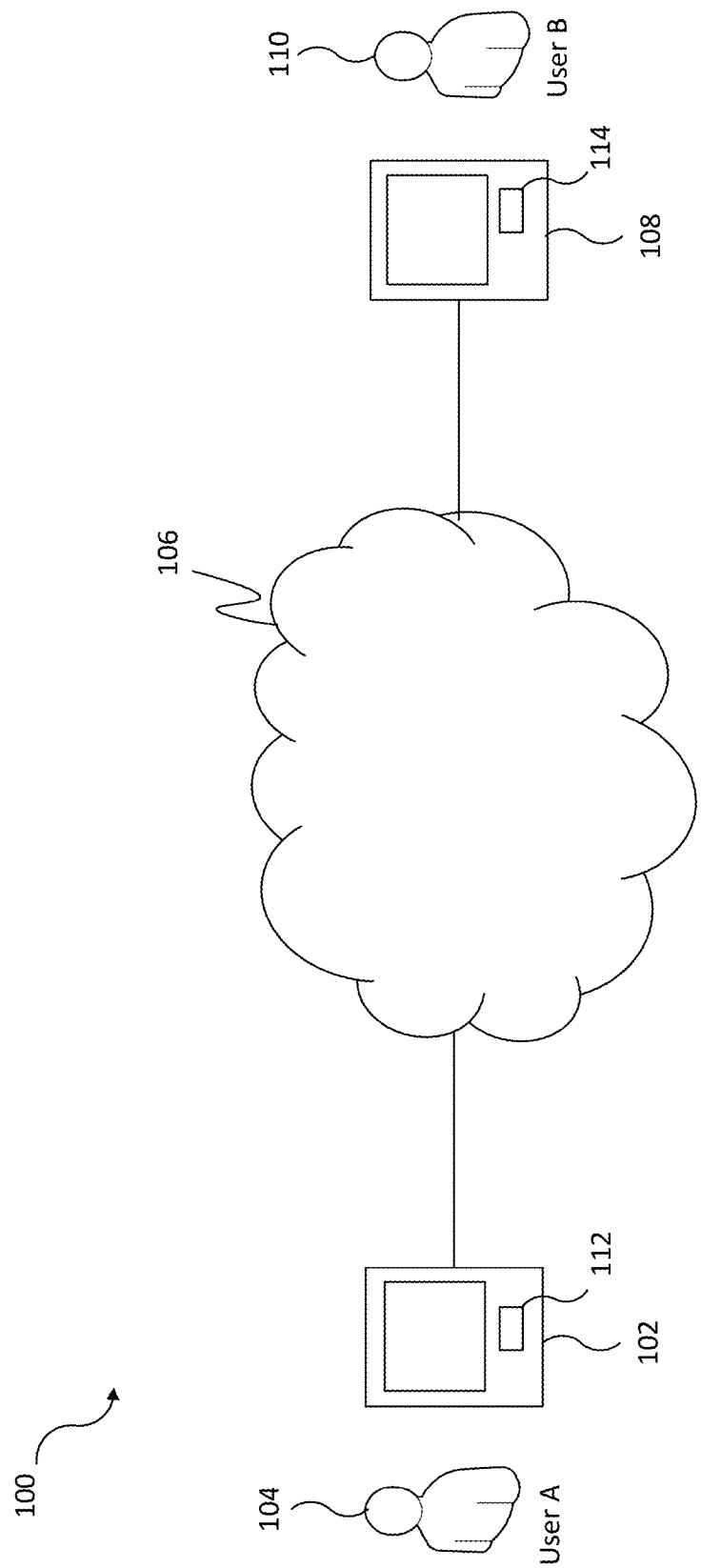
FIG. 1 shows a schematic view of a communication system.

FIG. 1 shows a communication system 100 comprising a first user 104 (User A) who is associated with a user terminal or device 102 and a second user 110 (User B) who is associated with a second user terminal or device 108. The user devices 102 and 108 can communicate over a communication network 106 in the communication system 100, thereby allowing the users 104 and 110 to communicate with each other over the communication network 106. The communication network 106 may be any suitable network which has the ability to provide a communication channel between the first user device 102 and the second user device 108. For example, the communication network 106 may be the Internet or another type of network such as a high data rate cellular or mobile network, such as a $3^{rd}$ generation ("3G") mobile network.

Note that in alternative embodiments, user devices can connect to the communication network 106 via an additional intermediate network not shown in FIG. 1. For example, if the user device 102 is a mobile device, then it can connect to the communication network 106 via a cellular or mobile network (not shown in FIG. 1), for example a GSM, UMTS, 4G or the like network.

The user devices 102 and 104 may be any suitable device and may for example, be a mobile phone, a personal digital assistant ("PDA"), a personal computer ("PC") (including, for example, Windows™, Mac OS™ and Linux™ PCs), a tablet computer, a gaming device, a wearable device or other embedded device able to connect to the communication network 106. The wearable device may comprise a wearable headset.

It may be appreciated that one or more of the user devices may be provided by a single device. One or more of the user devices may be provided by two or more devices which cooperate to provide the user device or terminal.

In some embodiments, at least two user devices in a call may be the same type of device or different.

The user device 102 is arranged to receive information from and output information to User A 104.

The user device 102 executes a communication client application 112, provided by a software provider associated with the communication system 100. The communication client application 112 is a software program executed on a local processor in the user device 102. The communication client application 112 performs the processing at the user device 102 in order for the user device 102 to transmit and receive data over the communication system 100. The communication client application 112 executed at the user device 102 may be authenticated to communicate over the communication system through the presentation of digital certificates (e.g. to prove that user 104 is a genuine subscriber of the communication system—described in more detail in WO 2005/009019).

The second user device 108 may be the same or different to the user device 102. The second user device 108 executes, on a local processor, a communication client application 114 which corresponds to the communication client application 112 executed at the user device 102. The communication client application 114 at the second user device 108 performs the processing to allow User B 110 to communicate over the network 106 in the same way that the communication client application 112 at the first user device 102 performs the processing to allow the User A 104 to communicate over the network 106. The user devices 102 and 108 are end points in the communication system.

FIG. 1 shows only two users (104 and 110) and two user devices (102 and 108) for clarity, but many more users and user devices may be included in the communication system 100, and may communicate over the communication system 100 using respective communication clients executed on the respective user devices, as is known in the art.

In some embodiments a video call takes place between at least two users. However, it may be appreciated that other embodiments may not have a video call set up.

In some embodiments, a video stream is received by one user device which is from another user device. The another user device permits annotation of at least one video image of the video stream and sends information to the one user device which is able to view the annotations. The information may comprise the annotated image itself or information which allows the annotated image to be recreated at the one user device.

Figure 2:
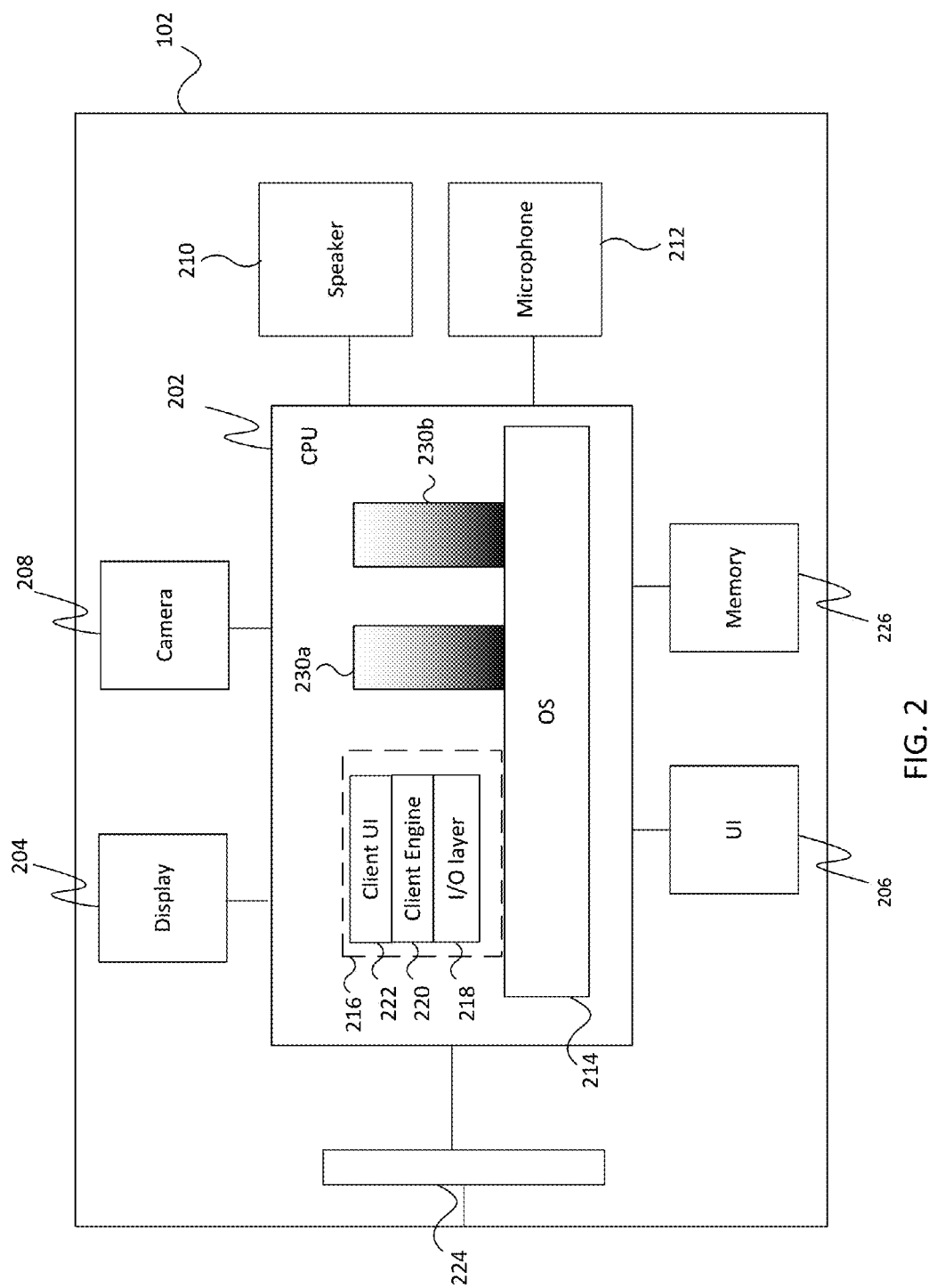
FIG. 2 shows a schematic view of a user device.

FIG. 2 illustrates a schematic view of the user device 102 on which is executed a communication client application for communicating over the communication system 100. It may be appreciate that the other user device 108 may be the same or have at least some of the modules shown. In some embodiments, one or more of the parts of the user device 102 shown in FIG. 2 may be optional. As mentioned previously, a user device of some embodiments may be a single device or may be provided by a plurality of devices which together provide the user device functionality.

The user device 102 comprises a central processing unit ("CPU") 202, to which is connected a display 204 such as a screen or touch screen, virtual display or the like, input devices such as a user interface 206 (for example a keypad), a camera 208, and touch screen 204. In some embodiments, the display may instead be provided by a projecting module which is configured to project an image onto a surface.

In some embodiments the user interface 206 may be a keypad, keyboard, mouse, pointing device, touchpad or similar. However the user interface 206 may be any suitable user interface input device, for example gesture or motion control user input, head-tracking or eye-tracking user input. Furthermore the user interface 206 in some embodiments may be a 'touch' or 'proximity' detecting input configured to determine the proximity of the user to a display 204. Thus in some embodiments, the user interface may be provided by a touch screen.

In embodiments described below the camera 208 may be a conventional webcam that is integrated into the user device 102, or coupled to the user device via a wired or wireless connection. Alternatively, the camera 208 may be a depth-aware camera such as a time of flight or structured light camera. The camera 208 may comprise multiple image capturing elements. The image capturing elements may be located at different positions or directed with differing points or view such that images from each of the image capturing elements may be processed or combined. For example the image capturing elements images may be compared in order to determine depth or object distance from the images based on the parallax errors. Furthermore in some examples the images may be combined to produce an image with a greater resolution or greater angle of view than would be possible from a single image capturing element image. In some embodiments, the camera may be provided by a plurality of cameras.

In some embodiments, one or more cameras may be provided to track the movement of the eyes of a user. The one or more cameras may be dedicated cameras or may also provide scene views. In some embodiments, the eye tracking cameras provide an input to an algorithm to control the video stream provided to another user. For example the video stream provided to the another user may be of the part of the scene which the user of the current device is currently viewing. This may be the case for example in the case where the user device is in the form of a headset or head mounted device.

An output audio device 210 (e.g. a speaker, speakers, headphones, earpieces and/or the like) and an input audio device 212 (e.g. a microphone, or microphones) are connected to the CPU 202. The display 204, user interface 206, camera 208, output audio device 210 and input audio device 212 may be integrated into the user device 102 as shown in FIG. 2. In alternative user devices one or more of the display 204, the user interface 206, the camera 208, the output audio device 210 and the input audio device 212 may not be integrated into the user device 102 and may be connected to the CPU 202 via respective interfaces. One example of such an interface is a USB (universal serial bus) interface.

The CPU 202 is connected to a network interface 224 such as a modem for communication with the communication network 106. The network interface 224 may be integrated into the user device 102 as shown in FIG. 2. In alternative user devices the network interface 224 is not integrated into the user device 102.

The user device 102 also comprises one or more memories 226 for storing data as is known in the art. The memory 226 may be a permanent memory, such as ROM. The memory 226 may alternatively or additionally comprise a temporary memory, such as RAM.

The user device 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes that data for transmission as streams to other end-user devices of the communication system 100. The client engine layer 220 handles the connection management functions of the VoIP system as discussed above, such as establishing calls or other connections by server-based or P2P (peer to peer) address look-up and authentication. The client engine may also be responsible for other secondary functions not discussed herein. The client engine 220 communicates with the client user interface layer 222. The client engine 220 may be arranged to control the client user interface layer 222 to present information to the user of the user device 102 via the user interface of the communication client application 112 which is displayed on the display 204 and to receive information from the user of the user device 102 via the user interface.

Running on top of the OS 214 may be further applications 230*a* and *b*. Embodiments are described below with reference to the further applications 230*a* and *b* and communication client application 112 being separate applications, however the functionality of the further applications 230*a* and *b* can be incorporated into the communication client application 112.

Figure 3:
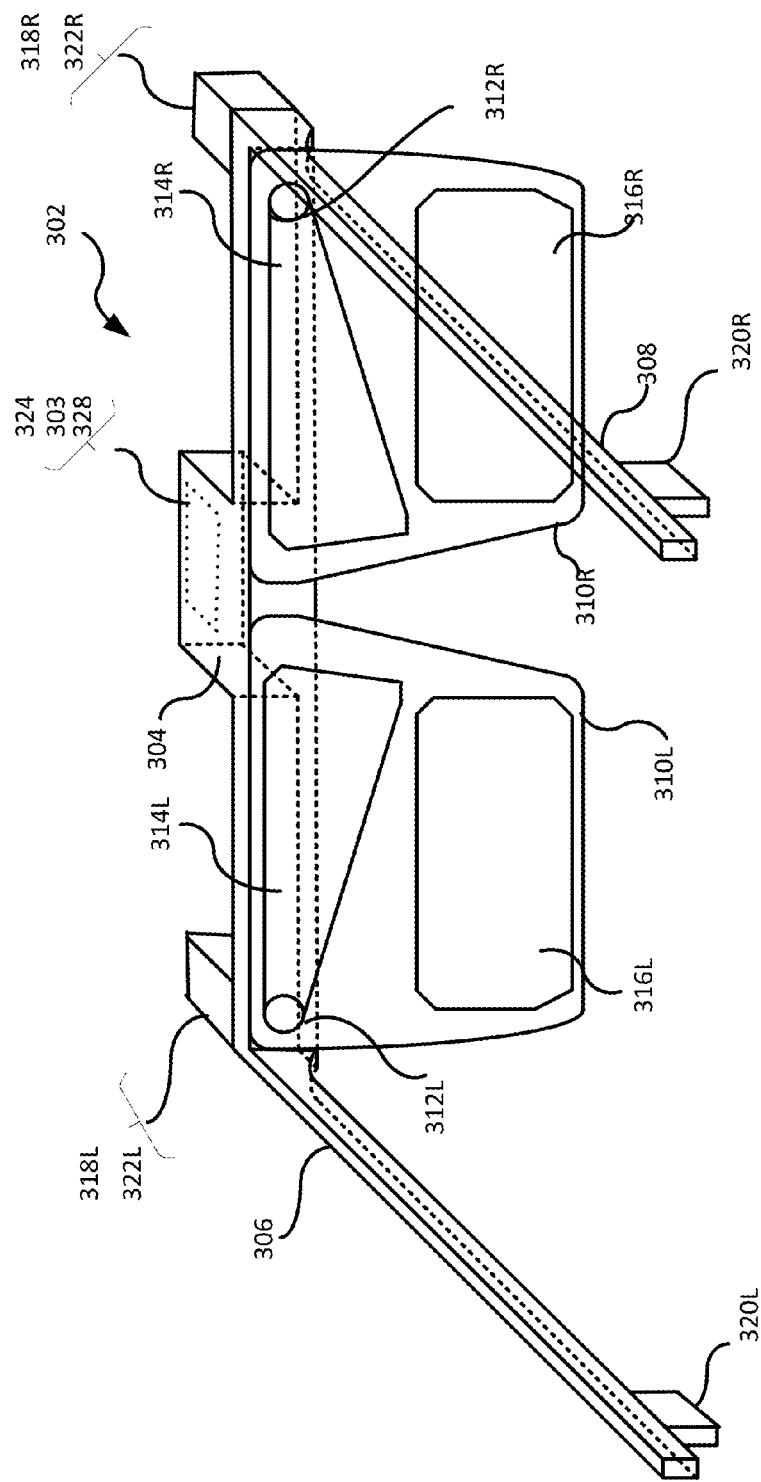
FIG. 3 shows a schematic view of a user device as a wearable headset.

In one embodiment, shown in FIG. 3, the user device 102 is in the form of a headset or head mounted user device. The head mounted user device comprises a frame 302 having a central portion 304 intended to fit over the nose bridge of a wearer, and a left and right supporting extensions 306, 308 which are intended to fit over a user's ears. Although the supporting extensions 306, 308 are shown to be substantially straight, they could terminate with curved parts to more comfortably fit over the ears in the manner of conventional spectacles.

The frame 302 supports left and right optical components, labelled 310L and 310R, which may be waveguides e.g. formed of glass or polymer.

The central portion 304 may house the CPU 303, memory 328 and network interface 324 such as described in FIG. 2. Furthermore the frame 302 may house a light engines in the form of micro displays and imaging optics in the form of convex lenses and a collimating lenses. The light engine may in some embodiments comprise a further processor or employ the CPU 303 to generate an image for the micro displays. The micro displays can be any type of light of image source, such as liquid crystal display (LCD), backlit LCD, matrix arrays of LEDs (whether organic or inorganic) and any other suitable display. The displays may be driven by circuitry which activates individual pixels of the display to generate an image. The substantially collimated light from each display is output or coupled into each optical component, 310L, 310R by a respective in-coupling zone 312L, 312R provided on each component. In-coupled light may then be guided, through a mechanism that involves diffraction and TIR (total internal reflection), laterally of the optical component in a respective intermediate (fold) zone 314L, 314R, and also downward into a respective exit zone 316L, 316R where it exits towards the users' eye.

The optical component 310 may be substantially transparent such that a user can not only view the image from the light engine, but also can view a real world view through the optical components.

The optical components may have a refractive index n which is such that total internal reflection takes place to guide the beam from the light engine along the intermediate expansion zone 314, and down towards the exit zone 316.

The user device 102 in the form of the headset or head mounted device may also comprise at least one camera configured to capture the field of view of the user wearing the headset. For example the headset shown in FIG. 3 comprises stereo cameras 318L and 318R configured to capture an approximate view (or field of view) from the user's left and right eyes respectfully. In some embodiments one camera may be configured to capture a suitable video image and a further camera or range sensing sensor configured to capture or determine the distance from the user to objects in the environment of the user.

Similarly the user device 102 in the form of the headset may comprise multiple microphones mounted on the frame 306 of the headset. The example shown in FIG. 3 shows a left microphone 322L and a right microphone 322R located at the 'front' ends of the supporting extensions or arms 306 and 308 respectively. The supporting extensions or arms 306 and 308 may furthermore comprise 'left' and 'right' channel speakers, earpiece or other audio output transducers. For example the headset shown in FIG. 3 comprises a pair of bone conduction audio transducers 320L and 320R functioning as left and right audio channel output speakers.

Reference is made to FIGS. 4*a* to 4*d* which shows examples of the images displayed at the receiving device. All of the Figures shows the image displayed on the display 204 which is this example is a touch screen.

Figure 4B:
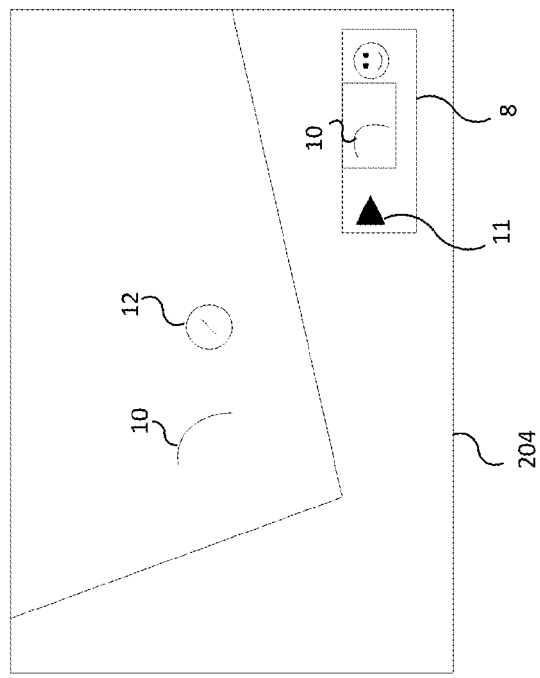
FIGS. 4a to 4d schematically show a display of a user device as an image is annotated.
Figure 4A:
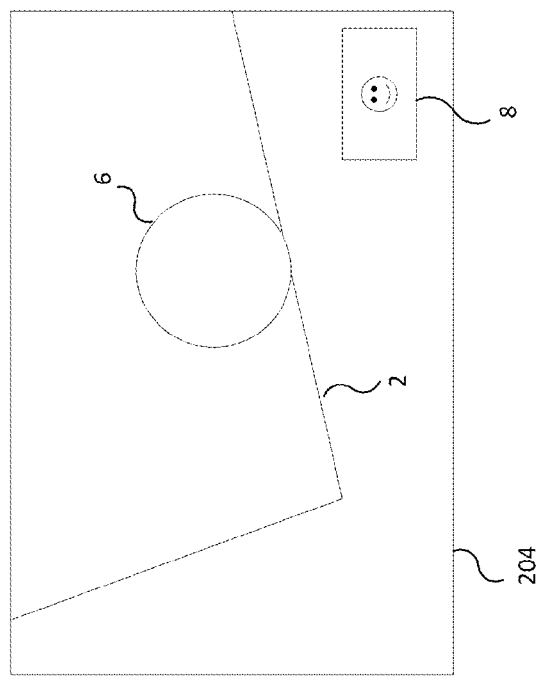

In FIG. 4*a*, the video stream has been paused and the video stream is displayed in a corner area of the display. This is referenced 8. The area 8 thus continues to display the received video stream but the video stream is now displayed at a much smaller size. In some embodiments, the displayed video stream appears to overly the paused video image. The paused image has an area 2 which the user of the device receiving the stream wishes to annotate. The display may be controlled to display a controller 6. In the example shown, the controller may be a radial menu which has different options displayed around a central area. The central area may contain the unpause option. It may be appreciated that in other embodiments, the controller may take any other suitable format. In some embodiments the controller may be displayed on a different area of the display to the call controllers. In other embodiments, the controller may be displayed along with or incorporate the call controllers.

In some embodiments, the unpause option is such that the paused image is no longer displayed. The live video stream may be displayed. This live video stream may be a full screen display. The live video stream may be real time.

The controller may have a drawing tool which is some embodiments may be the default selection.

In some embodiments a 3D mesh transition may indicate the drawing experience is spatial and provide affordances for the surfaces that can be drawn onto.

In some embodiments the video stream is received from the source device along with mesh information.

In FIG. 4b, the drawing tool has been selected. In some embodiments, an icon 12 may be displayed to indicate that the drawing tool has been selected. The user is then able to annotate any part of the paused image. In this example, the user wishes to annotate area 2 as mentioned above. In this example a line 10 is drawn. It may be appreciated that in some embodiments, the user can draw directly onto the screen to start the 3D annotation. The line may be placed on the 3D surface of a mixed reality scene displayed at the transmitter device.

The play icon 11 (which will unpause the image) may be displayed on top of the preview PiP (picture in picture)—that is on the displayed video image stream. In some embodiments, the play icon 11 may not be displayed after a given amount of time. In some embodiments, the play icon may fade out. When the user stops interacting with the screen, the play icon may be displayed again. In some embodiments, the play icon may be faded in. In some embodiments, the play icon may be optional.

In some embodiments, selecting the live stream window in the corner of the display would resume playing the video on the full-screen of the display. In some embodiments, this may unpause the paused image. There may or may not be an icon to facilitate this behaviour.

It may be appreciated that as the user touches the screen and creates the annotation, the controller 6 is replaced by the selected option, e.g. the drawing tool. It may be appreciated that in some embodiments, as the user touches the screen and creates the annotation, the drawing tool toggles to an eraser tool.

It may be appreciated that annotation information may be provided to the source device so that the user of the source device will see the annotations. In some embodiments, the video stream from the source device includes the annotations. As the video stream from the source device includes the annotations, the live video stream which is displayed on the screen at the same time as the paused image will also show the annotations.

In other embodiments the annotations applied to the image may be constructed locally in the receiver device and added to the video stream or added by a server device provided in the network between the source and receiving user devices.

Thus the annotations can be seen on the paused image and in the live video stream.

It may be appreciated that the video stream which is displayed may be controlled by the direction in which the user is looking at the source device. If the wearable source device is worn on the head, the video stream may be dependent on the direction in which the source device is pointed.

In an alternative embodiment, the video stream which is displayed maybe controlled by the optional eye tracking algorithm so that the images which are being viewed by the user at the source are displayed at the receiver.

Figure 4D:
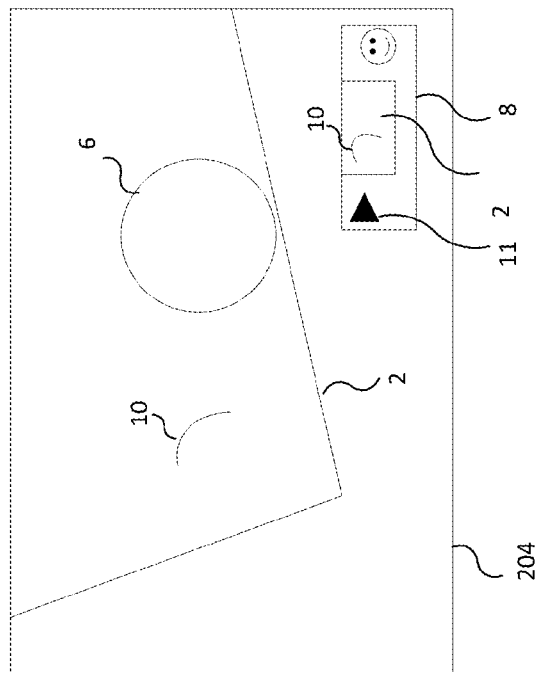
Figure 4C:
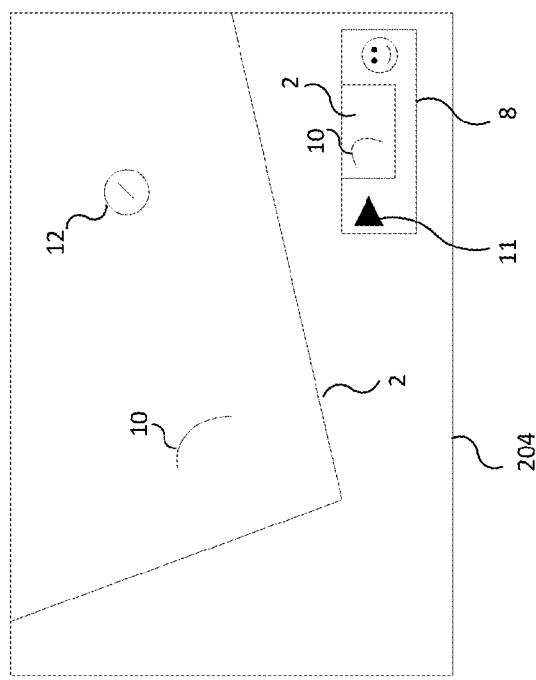

As shown in FIG. 4c, the user has moved the drawing icon 12.

As shown in FIG. 4d, the user has interacted with the drawing icon to cause the controller 6 to be displayed again with a plurality of menu options. The user may interact with the drawing icon in any suitable way and may for example tap, double tap, press and/or hold the drawing icon. The user my select the unpause option to resume the live view of the video stream. In some embodiments, a pause option is provided which when selected will toggle between the live view and pause options.

Figure 5:
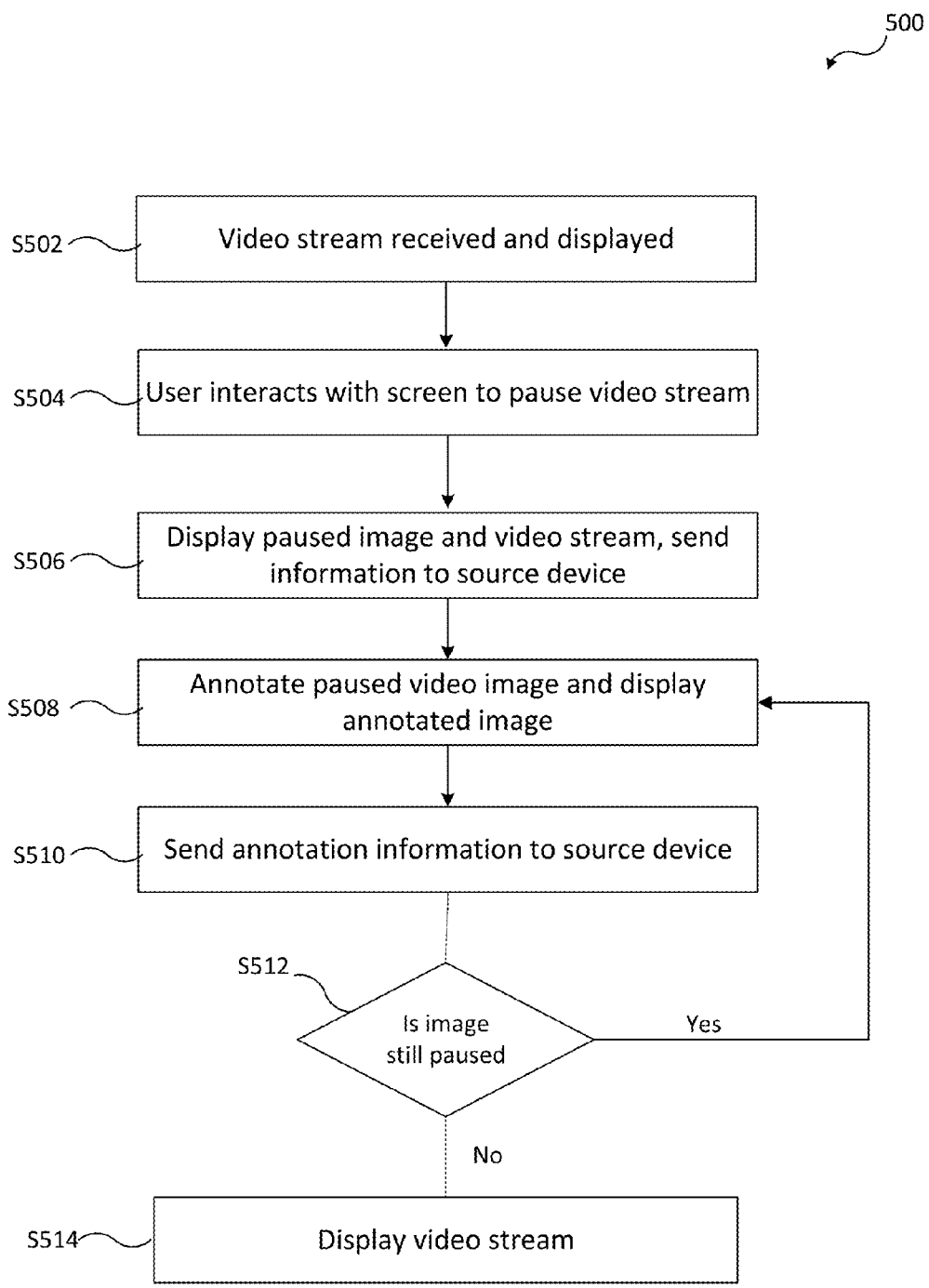
FIG. 5 shows a flowchart of a process performed at the user device at which the image is being annotated.

Reference is made to FIG. 5 which shows a flow chart 500 of a method performed at a receiver of a video stream while a call is being conducted between the first and second user devices.

The process starts at S500 in which a video stream is received and displayed at a first user device. The video stream is received from the second user device in this example. Mesh data and/or other SR data may be provided with the video stream.

At step S504, the user of the first user device interacts with the displayed image to cause the video stream to be paused. For example, if the video stream is being displayed on a touch screen, the user may pause the video stream by simply tapping or touching the touch screen. In some devices, the user may pause the video stream by suitable interaction with the user interface.

At step S506, the paused image is displayed. Additionally, the video stream continues to be displayed.

In some embodiments, the paused image will be the larger of the two images displayed and the video stream may be the smaller of the images display.

The video stream may overlie a relatively small part of the paused image.

The video stream may be arranged in a peripheral region of the display.

In other embodiments, the paused image and the video stream may be displayed in different relative sizes. For example, in some embodiments, half of the display may be used for the paused image and half of the display may be used for the video stream.

It may be appreciated that this is by way of example only and the relative sizes of the paused image and the video stream may take into account the size of the display area. For example on a tablet sized device, it may be that the paused image is very much bigger than the video stream. In a desktop type arrangement, the video stream and paused image may have larger areas.

In some embodiments, it is possible for the paused image to be smaller than the video stream.

In some embodiments, a toggle like mechanism may be provide where the user may flip between the paused view and the live video stream. In some embodiments only one of the paused view and the live video stream may be displayed at a time, the user being able to toggle or otherwise switch between the paused view and the live video stream. In other embodiments, both of the paused view and the live video stream are displayed at the same time and the user is able to switch or toggle between the views. For example if the paused view is the larger view and the video stream is the smaller view, the user could switch to a view where the paused view is the smaller view and the video stream is the larger view or vice versa.

In some embodiments, the user is able to select the size of one or more of the paused view and the live video stream. Alternatively or additionally, the user may be able to select the position of one or more of the paused view and the live video stream. This may be done via the user interface. Where the user interface is provided by the touch screen, this may be done by the user moving one or more of the paused view and the live video stream and/or by resizing one or more of the paused view and the live video stream.

In step S508, the user is able to annotate or otherwise modify the paused image and the annotations made to the paused video image are displayed together with the paused image as the user makes those annotations. As will be described later, the annotations may take any suitable form. The annotations may be text, lines, another image or the like.

In step 510, annotation information is sent to the source device from which the video stream has been received.

In step S512, a check is made to see if the image is still paused. Alternatively, an unpause event is awaited which will trigger step S514. Any suitable interaction by the user with the user device may cause the image to be unpaused. If the image is still paused, the user is able to continue the annotation of the paused video image, as set out in step S508 and the display thereof.

In some embodiments, the annotations or updates thereof are sent to the source device substantially in real time. In other embodiments, the annotations or updates thereof may be sent to the source device at time intervals. In some embodiments, the annotation may only be sent back to the source device after the image has been unpaused.

In some embodiments, information may be sent to the source device which will may indicate that the image is still paused at the receiving device.

If the image is not no longer paused, the next step is step S514 when the live video stream is displayed as usual. The paused image may no longer be displayed at the receiver side. However, it may be appreciated that the annotated image may continue to be displayed at the transmitter side and hence also in the video stream received at the receiving device.

After unpausing, the video stream is continued to be displayed in some embodiments and does not resume from the time when the video stream was originally paused. The video stream displayed may be substantially real time.

It should be appreciated the application 230a may be configured to detect that the user has paused the video stream. This may be responsive to an input receiver from the user interface. The application may be configured to cause a paused image to be displayed at the same time as the stream of video data (which is continued to be received after the pausing) is also displayed. The application may be configured control the relative sizes of the stream of video data and the paused image as described previously. The application 230a may be configured to control the video stream size to change, responsive to detecting that the user has unpaused the video stream.

The application may be configure to perform one or more of the steps of FIG. 5 and/or assist in the performing of one or more steps of FIG. 5.

In some embodiments, the application may be implemented by a computer program or software running on at least processor in conjunction with at least one memory.

Figure 6:
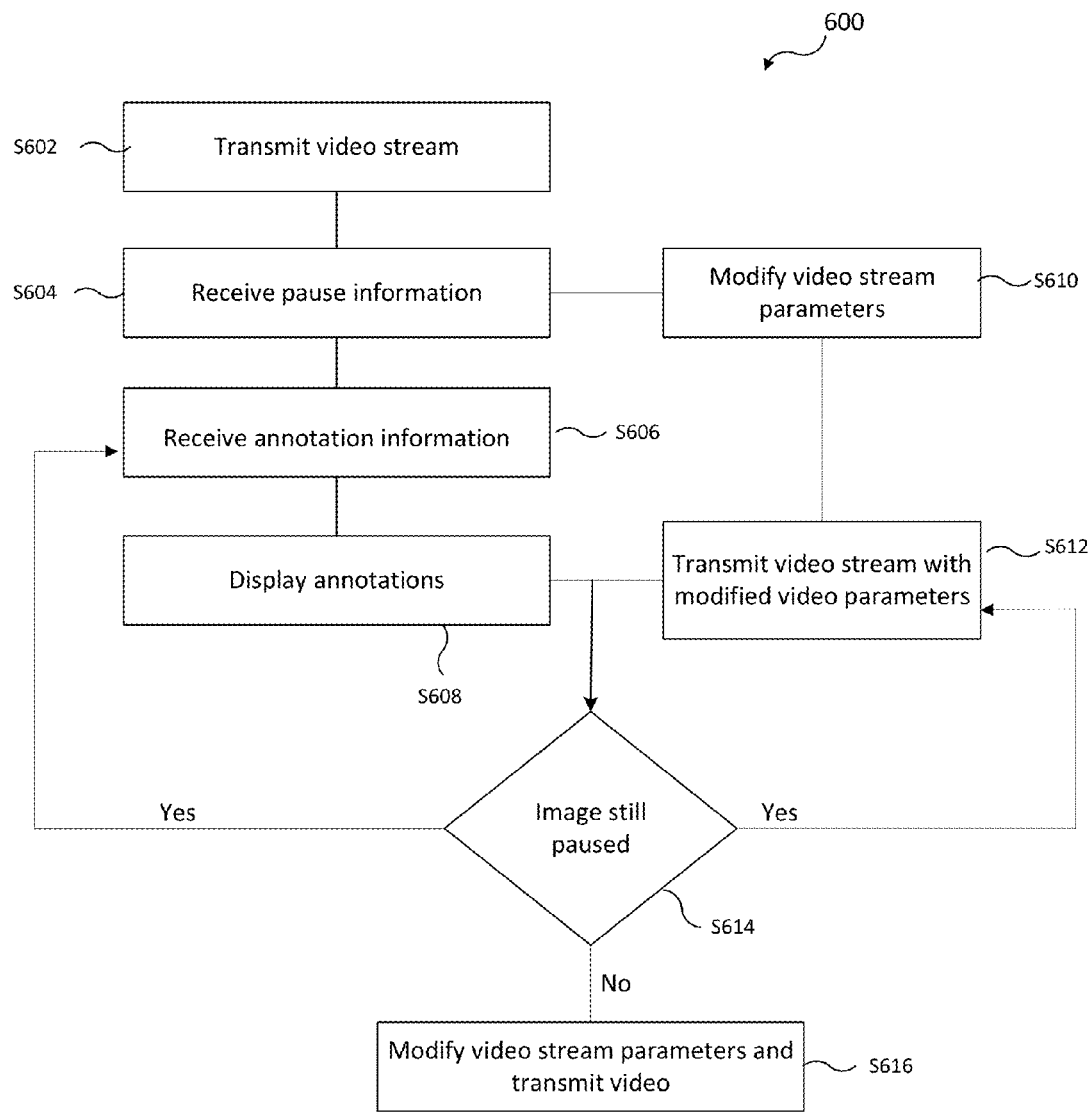
FIG. 6 shows a flowchart of steps a process at the user device which is the source of the image which is being annotated.

Reference is made to FIG. 6 which show a flow chart of the method performed at the device transmitting the video.

In step S602, the video stream is transmitted. This will be ongoing throughout a call, in some embodiments. Mesh information and/or the like may be transmitted along with the video stream.

In step S604, information is received from the receiver of the video stream indicating that the image has been paused. This information may include the image which has been paused or information from which it may be determined which image has been paused.

In step S606, annotation information is received from the receiving device.

In step S608, the annotations are displayed. The annotations are displayed overlying the associated image.

It may be appreciated that after the pause information is received in step S604, optionally step S610 may be performed. In this step, the video stream parameters may be modified. For example, if the video stream is to be displayed at the receive side is a smaller version of the image video stream, then a lower resolution stream may be sent, for example to save bandwidth.

In step S612, the video stream is transmitted with the modified video parameters.

Periodically, a check may be made to see if the image is still paused, in step S614. If it the image is still paused, the video stream will continue to be transmitted with the modified video parameters. It may be appreciated that in some embodiments, the transmitter will be responsive to receiving information indicating that the image is no longer paused. If the image is still paused, the annotation information may continue to be received and displayed.

If the image is no longer paused, the next step may be step S616 where the video stream parameters may be modified, for example back to the original video parameter settings and the video stream may be transmitted with updated video stream parameters.

It may be appreciated that in some embodiments, the video parameters may remain unchanged regardless of whether the image is paused or not.

In some embodiments, the video stream can be paused and/or unpaused in suitable manner. For example, if the video stream is being displayed on a touch screen, touching or tapping the screen may cause the video stream to be paused and/or unpaused. It may be appreciated that in other embodiments, the activation of a pointer device, such as a mouse or the like may provide a similar result. In other embodiments, any other suitable input received by the user will cause the video stream to be paused/unpaused.

In some embodiments, any contact with a touch screen displaying the video stream will pause the live video stream and allow the paused image to be annotated.

In some embodiments, it is possible for the user to activate a zoom in function. In the case of the touch screen, this may be activated by the user moving two of his digits on his hand apart or by any other suitable interaction with a user interface. Typically, this will be a finger and thumb which are moved away from one another. This movement may be the so called pinch out movement. A pinch out movement or other zoom in function during a video stream, will pause the image and zoom in on the image at the same time.

In some embodiments, if the video stream is already paused, the user will be able to zoom in with the pinch out or similar action.

The some embodiments, a zoom out function may be achieved by a user using the so called pinch in action in which the finger and thumb are moved together. It may be appreciated that in some embodiments, the zoom out function may be achieved in any other suitable manner via the user interface. In some embodiments, the performance of a zoom out function on the video stream only results in the image being paused if the paused image of the video stream is at its limit for zoom out. In other embodiments, the zoom out function may result in a zoom out function being performed as well as a pausing of the video stream.

It may be appreciated that in some embodiments, the user may tap, press, click are otherwise interact with the display to start an annotation. The user may move his finger, a stylus or pointer device across the display to define the annotation. In some embodiments, if a user interacts with the display by touching with two fingers, two annotations can be provided as the user moves his fingers across the display.

Running on top of the OS 214 is a frame modification application 230b. Embodiments are described below with reference to the frame modification application 230b and communication client application 112 being separate applications, however the functionality of the frame modification application 230b described in more detail below can be incorporated into the communication client application 112.

Figure 8:
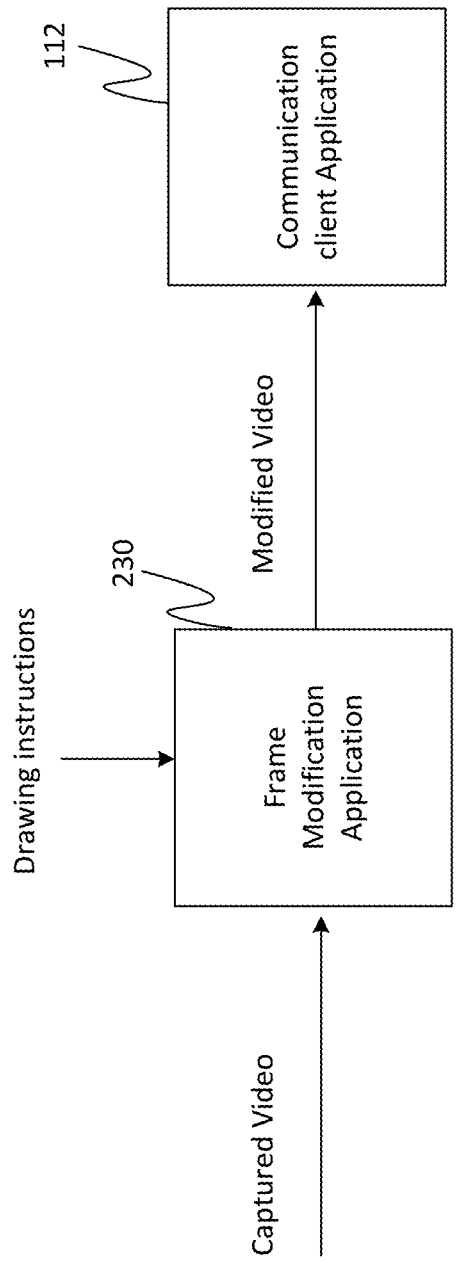
FIG. 8 illustrates communication between a frame modification application and a communication client application executed on a user device.

FIG. 8 illustrates how a frame modification application 230b of the user device interacts with the communication client application 112. In some embodiments, the frame modification application can be provided in the receiving device and/or the source device.

As shown in FIG. 8, the frame modification application 230b is arranged to receive captured video (the paused image) and drawing or annotation instructions. The frame modification application 230b is arranged to modify captured (paused) video frames in dependence on drawing instructions and supply modified video frames to the communication client application 112.

In embodiments described below the frame modification application 230b receives the video frames and the frame modification application 230b receives drawing instructions from a user. A paused image frame that have been modified in response to the drawing instructions received from a user of the receiving device are supplied from the frame modification application 230b to the communication client application 112 for transmission over the network 106 back to the source user device. It may be appreciated that the paused image along with the annotations are displayed at the receiving device. Alternatively the annotation or drawing instructions may be sent back to the source user device and a frame modification application may apply the annotations locally at the source device to display to the user of the source device.

The frame modification application 230b presents information to the user via a user interface which is displayed on the display 204. This information will allow the user to annotate the image and will control the display of the controller, for example. This is for example as illustrated in FIGS. 4a to d.

It may be appreciated that the video stream from the source device may comprise video mesh information.

A three-dimensional tracker functionality may be provided which identifies a plurality of points of image in the captured video data and tracks these points if the object which may be a face or the like moves. In other embodiments, the object may be stationary. The object is displayed in the paused image and is annotated. The paused image may be considered to be an object or may be consider to comprise one or more objects.

In some embodiments, annotations drawn by a user on the paused image may be mapped onto points of the object identified by the tracker so that the drawing moves with the object three-dimensionally. The object may be a face or any other suitable object. The annotations may be applied to a moving object at the source device using the annotation information in association with mesh information and/or texture map information provided from the receiver device.

Points in two-dimensions are fitted to a three-dimensional triangulated mesh to the tracked feature points. The tracker algorithm determines three-dimensional pixel co-ordinates (x,y,z) of each vertex of the three-dimensional triangulated mesh that is fitted to the object. The three-dimensional triangulated mesh comprises a plurality of vertices which define a plurality of triangles. This mesh information may be provided from the source device. The co-ordinates of each vertex of the three-dimensional triangulated mesh define the position of the vertex in the frame, this may be defined in terms of pixel number. As described above, the camera 208 in the source device may be a conventional or a depth-aware camera. When the camera 208 is a depth-aware camera the depth information output by the depth-aware camera is used as an additional input to the tracker algorithm.

The frame modification application 230b is configured to compute a two dimensional representation of the three-dimensional triangulated mesh. This is referred to herein as a two-dimensional texture map. This may be determined at the source device.

The various possible techniques to compute a two dimensional representation of the three-dimensional triangulated mesh are well known to persons skilled in the art and are therefore not discussed in detail herein. One example method comprises (i) projecting the three-dimensional triangulated mesh onto an ellipsoid; and (ii) projecting the ellipsoid into two-dimensions (for example using the Gall-Peters equal area map projection).

Figure 9:
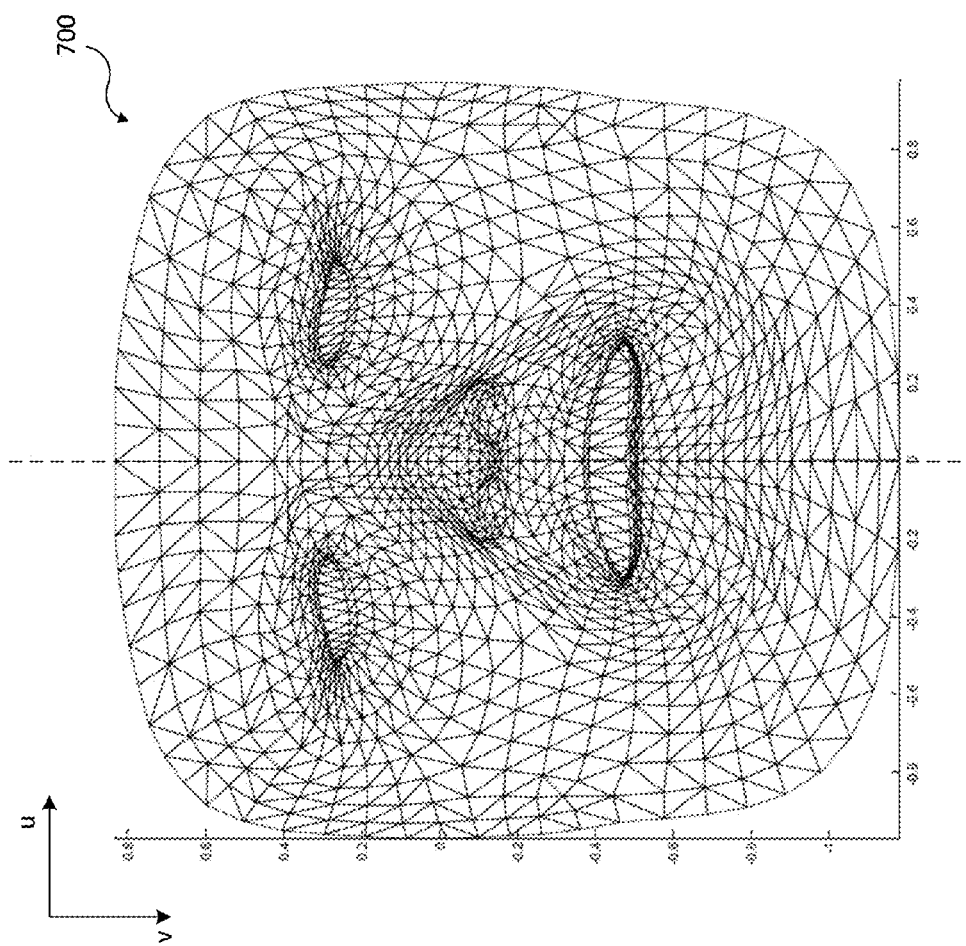
FIG. 9 illustrates a two dimensional texture map.

The two-dimensional texture map is overlaid on a pixel grid that is a number of pixels wide and that is a number of pixels high. This pixel width and pixel height define the resolution of the pixel grid. The resolution of the pixel grid may for example be 512×512. UV coordinates (expressed as pixel co-ordinates of the pixel grid) are used to describe the surface of the two-dimensional texture map 700 shown in FIG. 9. Each u,v co-ordinate in the two-dimensional texture map has a corresponding x,y pixel co-ordinate in the video frame. It will be apparent to persons skilled in the art will appreciate that is appropriate to select a pixel resolution of the pixel grid that approximately corresponds to the maximum size of an object in the received image.

The frame modification application performs a texture mapping process whereby the texture of each triangle of the three-dimensional triangulated mesh copied to the corresponding triangle in the two-dimensional texture map. Reference to the "texture" of a triangle in the three-dimensional triangulated mesh is used herein to refer to the colour values of each pixel in the particular triangle in the three-dimensional triangulated mesh. A pixel colour value may be defined in accordance with the RGB colour model.

The frame modification application 230b determines and stores the u,v co-ordinates that correspond to the co-ordinates (x,y) of the annotation. The two-dimensional texture map is modified in accordance with the annotation. That is, for the u,v co-ordinates determined the frame modification application 230b modifies the u,v co-ordinate of the two-dimensional texture map in accordance with its associated effect information. The frame modification application 230b performs a texture mapping process where the texture of each triangle in the two-dimensional texture map is copied to the corresponding triangle of the three-dimensional triangulated mesh. Reference to the "texture" of a triangle in the two-dimensional texture map is used herein to refer to the colour values of each pixel in the particular triangle in the two-dimensional texture map.

The frame modification application 230b may supply the modified video frame to the communication client application 112 for transmission to the other user device over the network 106.

In the embodiment described above, any modified frame that is displayed in the user interface provided by the frame modification application 230b on the display 204 is transmitted by the communication client application 112 of the receiving device to the source device.

In some embodiments, mesh information and/or a texture map is provided along with the video stream to the receiver device. The annotation information is associated with the mesh information and/or texture map at the receiver device and may be transmitted back the source device. A frame modification application at the source may use this information to apply the annotations to the object. This may be used where the object moves. A frame modification application at the receiver may be used to provide the annotated paused image.

Some embodiments may be used in a mixed reality (MR) application, however in other embodiments the same concepts may be applied to any communication application involving two or more participants. Mixed reality applications may for example involve the sharing of a scene, wherein a device comprising a camera is configured to capture a video and transmit video to other devices. Furthermore an image of the video may be annotated by the remote device and 'placed' within the image scene of the source device.

In order to enable an object to be annotated by a remote device, surface reproduction (SR) or mesh data associated with the objects may be passed to one or more other participants.

Figure 7A:
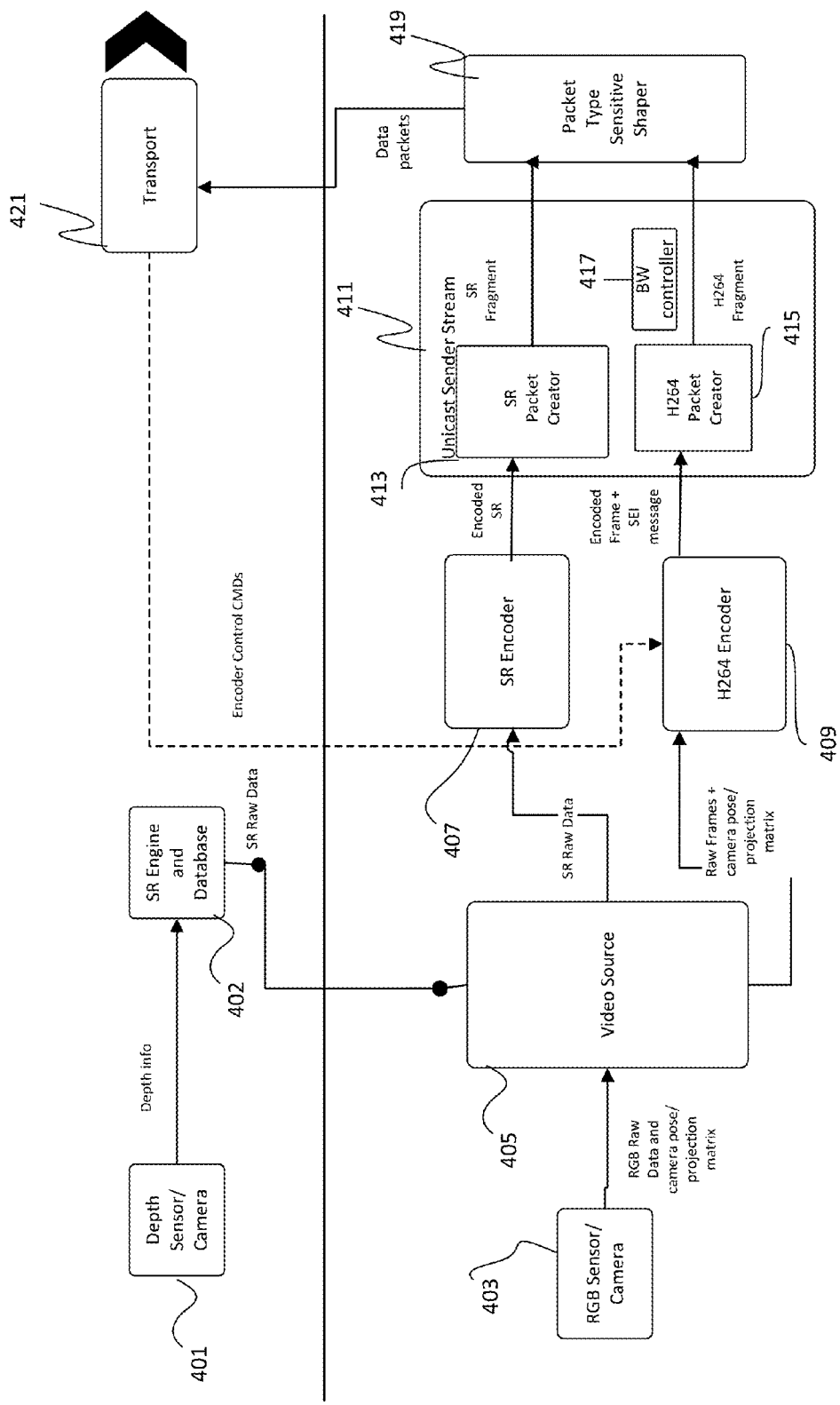
FIGS. 7a and 7b show a schematic view of an example sender and receiver pipeline for combined video and surface reproduction SR data.

With respect to FIG. 7a an example of a suitable sending (media stack) pipeline architecture for a user device. The user device may in such embodiments as described herein be configured to generate image (video data) and surface reproduction (SR) or mesh data. This video data and SR or mesh data may be sent to the receiving device for use with the annotating as described previously.

In the example shown when the image used to generate the shared scene may be captured by a (Red-Green-Blue) RGB sensor/camera 403. The RGB sensor/camera 403 may be configured to pass the captured RGB raw data and furthermore pass any camera pose/projection matrix information to a suitable device video source 405.

The example architecture shown in FIG. 7a furthermore comprises a depth sensor/camera 401 configured to capture depth information which can be passed to a surface reproduction (SR) engine and database 402. The SR engine and database may be configured to receive the depth information and generate SR raw data according to a known mesh/SR method. The SR raw data can then be passed to the device video source 405.

The video source 405 may be configured to receive the SR raw data and the RGB raw data and any camera pose/projection matrix information. Furthermore the video source 405 may be configured to output the SR raw data to a suitable SR channel encoder 407 and the video image data in terms of raw frame and camera pose/projection matrix data to a suitable H.264 channel encoder 409.

The SR channel encoder 407 may be configured to receive and to encode the SR raw data to generate suitable encoded SR data. The SR channel encoder 407 may then be configured to pass the encoded SR data to a packet generator 411. Specifically the encoded data may be passed to a SR packet creator 413.

The H.264 channel encoder 409 may similarly be configured to receive the raw image/video frames and camera pose/projection matrix data and process these to generate an encoded frame and SEI (supplemental enhancement information) message data. The encoded frame and SEI message data may be passed to the packet generator 411 and specifically to a H.264 packet creator 415.

The packet generator 411 may control the packaging of the video and the SR data in order that the receiver of the data is able to produce a reliable and effective mixed reality experience.

The packet generator 411 may for example comprise a SR packet creator 413. The SR packet creator 413 may be configured to generate SR fragment packets which can be passed to the packet type sensitive shaper 419. The SR packet creator 413 furthermore may be controlled for retransmission feedback purposes. In some embodiments using a NACK method for retransmission feedback may not be suitable and therefore an ACK method may be implemented.

The SR packet creator 413 may therefore in some embodiments be configured to hold references of any SR data packets in a pending buffer until they are sent. Once the packets are sent, the references may then be moved to an unacknowledged buffer.

In such embodiments the unacknowledged buffer may have a window size that limits the traffic between sender and receiver.

The references of the SR data packets may then be maintained until the receiver acknowledges that the packets are received.

In some embodiments the SR packet creator 413 may be configured to keep sending SR data packets from the pending buffer when the SR frame arrives, even when there is no feedback message received. Implementing a keep sending method means that starvation at the receiver may not occur.

The packet generator 411 may comprise a H.264 packet creator 415. The H.264 packet creator 415 may be configured to generate suitable H.264 packet fragments and pass these packet fragments to the packet type sensitive shaper 419.

The packet generator 411 may comprise a bandwidth (BW) controller 417 configured to control the generation and output of the packet fragments. The BW controller 417 may be responsible for splitting bandwidth allocations between the SR packet creator 413 and H.264 packet creator 415.

The packet sensitive shaper 419 may be configured to receive the SR packet fragments and H.264 packet fragments and generate suitable data packets which are passed to the transport 421. The transport 421 receives the data packets and outputs of these via a suitable output stream.

Figure 7B:
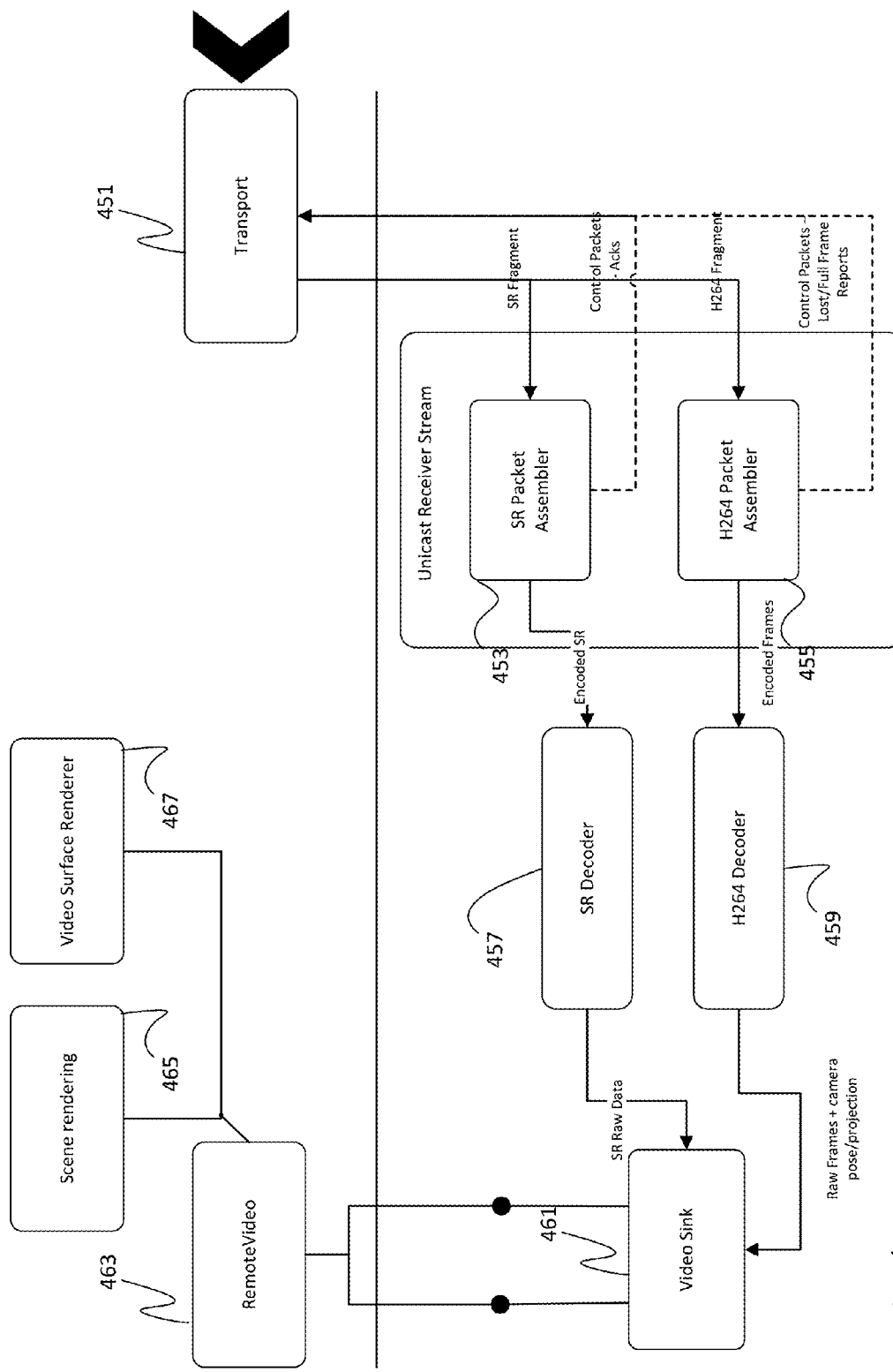

With respect to FIG. 7b a suitable receive pipeline (media stack) architecture for the user device configured to receive image (video data) and surface reproduction (SR) or mesh data is shown.

The user device may comprise a transport 451 configured to receive the video stream data and pass this information to a receiver/packet assembler.

The packet assembler may comprise a SR packet assembler 453 and a H.264 packet assembler 455. The SR packet fragments may be passed to the SR packet assembler 453 for generating encoded SR data packets. The H.264 packet assembler 455 may be configured to receive the H.264 packet fragments and generate encoded frame data.

The SR packet assembler 453 may be configured to generate a suitable feedback message which may be sent to the SR packet creator in order to control the re-transmission of the SR data. A SR channel decoder 457 may report an error which causes a feedback message to be generated.

The encoded SR data packets may be passed to a SR channel decoder 457 to generate SR raw data.

The H.264 channel decoder 459 may be configured to receive the encoded frames from the packet assembler 455 and outputs suitable raw frames and camera pose/projection data. The SR raw data and the raw frames and camera pose/projection data can then be passed to the video sink 461.

The video sink 461 may then be configured to output the information to suitable remote video applications 463 or libraries for rendering at a renderer 465 or video service rendering at a video surface renderer 467.

Furthermore any data received via the transport 451 with regards to objects or annotations can be passed to a suitable object protocol entity, for example an object update message decoder and may be passed to a suitable annotation or object renderer.

In implementing architecture such as described herein a MR scene in the form of video or image data and the data to generate a 3D rendering of the scene may be transferred from one device to the other reliably and using the available bandwidth effectively.

As described herein one of the aspects of MR is the ability to share and annotate a captured scene. For example the video captured by one participant in the scene may be annotated.

The placement of the object may be made with respect to the scene and furthermore a three dimensional representation of the scene. In order to enable accurate placement to be represented or rendered on a remote device surface reproduction (SR) or mesh data associated with the scene may be passed to all of the participants of the shared scene.

As described herein one of the aspects of MR is the ability to share and annotate an object. For example the image captured by one participant in the scene may be annotated by another user at a different device. A scene owner may be provided by a first user device and may be a protocol endpoint sharing its mixed reality scene with other participants. For example the scene owner may comprise a user operating a user device such as shown in FIG. 3 and capturing the environment of the user A.

A scene participant may be a protocol endpoint which is configured to receive a video stream of the mixed reality scene generated by the scene owner and apply annotations to a paused image where the image is in the video stream received from the scene owner. This may be provided by a second user device operated by user B. In some embodiments, the second user device may be a touch screen device, computer, mobile phone or the like.

Whilst embodiments have been described with reference to annotations being made by a user to a paused image of a video stream from a mixed reality environment, embodiments may be used with any video stream received from a source device.

Some embodiments have been described as using SR mesh. This is by way of example only and other embodiments may not use SR mesh. An annotation may comprises any image data applied by the user to the paused image and may be lines, text, images, labels or any other suitable image data.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Thus there is provided a user device comprising: a display; a user interface; a network interface configured to receive a video data stream at the user device from another user device via a communication network, said display configured to display said video data stream; and at least one processor configured to: detect an interaction via said user interface to pause said video stream and to display a paused video frame of said video stream and to also display said video data stream; detect application of at least one annotation via the user interface to said paused video frame; cause said paused video frame and said at least annotation to be displayed by said display along with said video data stream; and cause information about said at least annotation to be sent via said network interface to said another user device.

The network interface may be configured to receive video frames of said stream of video data comprising said object and said at least one annotation and said display may be configured to display said received video frames of said stream of video data comprising said object and said at least one annotation along with said paused video frame The display may be a touch screen display and may be configured to provide said user interface, and said detected interaction via said user interface to pause said video stream may comprise an interaction with said touch screen display.

The at least one processor may be configured responsive to detection of a movement on said display when said display is displaying said received video frames of the stream of video data, said movement representing a zoom function and in response to detecting said movement pausing said received video frame, to perform a zoom function and cause the display of said paused received video frame in dependence on the zoom function.

The at least one processor may be configured to, prior to performing said zoom function, determine if said zoom function can be performed and only performing said zoom function if it is determined that said zoom function can be performed.

The at least one processor may be configured to cause the display of said received video frames of the stream of video data in a peripheral area of said display when said paused received video frame is displayed.

The at least one processor may be configured to control the display such that the displayed paused received video frame is larger than the displayed received video frames of the stream of video data.

The at least one processor may be configured responsive to detection of the selection of a pause option, cause a display of menu information providing one or more annotation options.

The at least one processor may be configured to control the displaying of an unpausing icon in association with said received video frames of the stream of video data, selection of said icon causing unpausing of said paused received video frame.

The at least one processor may be configured to control displaying of said unpausing icon in dependence on time since an annotation has last been applied.

The display may be configured to display said paused received video frame and said at least one annotation.

The device may be configure to receiving mesh information from said further user device via the network interface.

The at least one processor may be configured to use said mesh information of said object of said paused video frame and said annotation input to provide image data comprising the paused received video frame and said at least one annotation.

The user device and the further user device may be in a video call.

The received video frames of the stream of video data may be of a mixed reality scene.

There is also provided a method implemented at a user device, the method comprising: displaying video frames of a stream of video data received from a further user device over a communications network; detecting selection of a pause option via a user interface of said user device when a received video frame is being displayed to pause said received video frame; in response to said detection, displaying both said paused received video frame and received video frames of the stream of video data; receiving via the user interface at least one annotation input defining at least one annotation to be applied to an object of said paused received video frame; and causing information about said at least annotation to be sent to said further user device.

The method may comprise responsive to causing said information about said annotations to be sent to said further user device, receiving frames of data comprising said object and said at least one annotation and displaying said received frames of data comprising said object and said at least annotation together with said paused received video frame.

The display may provide said user interface, and detection of selection of said pause option may comprise detecting touching of said display.

The method may comprise detecting a movement on said display when said display is displaying said received video frames of the stream of video data, said movement representing a zoom function and in response to detecting said movement pausing said received video frame, performing a zoom function and displaying said paused received video frame in dependence on the zoom function.

The method may comprise prior to performing said zoom function, determining if said zoom function can be performed and only performing said zoom function if it is determined that said zoom function can be performed.

The method may comprise displaying said received video frames of the stream of video data in a peripheral area of said display when said paused received video frame is displayed.

The displaying may be such that the displayed paused received video frame is larger than the displayed received video frames of the stream of video data.

The method may comprise responsive to detection of the selection of a pause option, displaying menu information providing one or more annotation options.

The method may comprise displaying an unpausing icon in association with said received video frames of the stream of video data, selection of said icon causing unpausing of said paused received video frame.

The method may comprise controlling displaying of said unpausing icon in dependence on time since an annotation has last been applied.

The method may comprise displaying said paused received video frame and said at least one annotation.

The method may comprise receiving mesh information from said further user device.

The method may comprise using said mesh information of said object of said paused video frame and said annotation input to provide an image comprising the paused received video frame and said at least one annotation.

The user device and the further user device may be in a video call.

The received video frames of the stream of video data may be of a mixed reality scene.

A computer program may be provided, the computer program comprising computer executable instructions which when run on at least one processor cause any of the method steps previously discussed to be provided.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
  a display;
  a user interface;
  a network interface configured to receive a video data stream at the user device from another user device via a communication network, said display configured to display said video data stream; and
  at least one processor configured to:
    detect an interaction via said user interface to pause said video stream and to display a paused video frame of said video stream and to also display said video data stream;
    detect application of at least one annotation via the user interface to said paused video frame;

cause said paused video frame and said at least one annotation to be displayed by said display along with said video data stream;

cause information about said at least one annotation to be sent via said network interface to said another user device; and control display of an unpausing icon based on a time since the at least one annotation has last been applied, a selection of the unpausing icon configured to unpause the paused video frame.

2. The device of claim 1, wherein said network interface is configured to receive video frames of said stream of video data comprising an object and said at least one annotation and said display is configured to display said received video frames of said stream of video data comprising said object and said at least one annotation along with said paused video frame.

3. The device of claim 1, wherein said display is a touch screen display and is configured to provide said user interface, and said detected interaction via said user interface to pause said video stream comprises an interaction with said touch screen display.

4. A computer-readable storage device comprising instructions stored thereon that, responsive to execution by one or more processors of a user device, are configured to cause:

display of video frames of a stream of video data received from a further user device over a communications network;

detection of selection of a pause option via a user interface of said user device when a received video frame is being displayed to pause said received video frame;

display of both said paused received video frame and received video frames of the stream of video data, in response to said detection;

receiving via the user interface of at least one annotation input defining at least one annotation to be applied to an object of said paused received video frame;

sending of information about said at least annotation to said further user device; and display of an unpausing icon based on a time since the at least one annotation has last been applied, a selection of the unpausing icon configured to unpause the paused video frame.

5. The computer-readable storage device of claim 4, wherein received video frames of the stream of video data are of a mixed reality scene.

6. The computer-readable storage device of claim 4, wherein the user device and the further user device are in a video call.

7. The user device of claim 1, wherein received video frames of the video data stream are of a mixed reality scene.

8. The user device of claim 1, wherein the user device and the another user device are in a video call.

9. A computer-implemented method comprising:

receiving, at a user device, a video data stream from an additional user device via a communication network;

detecting, via a user interface displayed on a display of the user device, an interaction to pause said video stream;

displaying both a paused video frame of said video stream and the video data stream on the display of the user device;

detecting, via the user interface, application of at least one annotation to said paused video frame;

causing said paused video frame and said at least one annotation to be displayed by said display along with said video data stream;

cause information about said at least one annotation to be sent via a network interface to the additional user device; and control display of an unpausing icon based on a time since the at least one annotation has last been applied, a selection of the unpausing icon configured to unpause the paused video frame.

10. The computer-implemented method of claim 9, wherein received video frames of the video data stream are of a mixed reality scene.

11. The computer-implemented method of claim 9, wherein the user device and the additional user device are in a video call.

12. The computer-implemented method of claim 9, wherein said network interface is configured to receive video frames of said stream of video data comprising an object and said at least one annotation and said display is configured to display said received video frames of said stream of video data comprising said object and said at least one annotation along with said paused video frame.

13. The computer-implemented method of claim 9, wherein said display is a touch screen display and is configured to provide said user interface, and said detected interaction via said user interface to pause said video stream comprises an interaction with said touch screen display.

14. The computer-implemented method of claim 9, further comprising displaying said received video frames of the stream of video data in a peripheral area of said display when said paused received video frame is displayed.

15. The computer-implemented method of claim 9, wherein the displayed paused video frame is larger than the displayed received video data stream.

16. The computer-implemented method of claim 9, further comprising responsive to detection of interaction to pause said video, displaying menu information providing one or more annotation options.

* * * * *